Patented Jan. 5, 1937

2,066,905

UNITED STATES PATENT OFFICE 2,066,905

HALOGENATED METHYL ETHERS

Harold S. Booth, Cleveland Heights, Ohio, assignor to Westinghouse Electric & Manufacturing Company, East Pittsburgh, Pa., a corporation of Pennsylvania No Drawing. Application March 23, 1935, Serial No. 12,740

10 Claims. (Cl. 260—151)

This invention relates to refrigerants.

It is desirable to employ organic compounds as refrigerants which are chemically stable and non-toxic. It is further desirable to employ as refrigerants organic compounds which have a low boiling point so as to facilitate the absorption of heat in the chamber to be cooled.

An object of this invention is to produce chemically stable non-toxic organic compounds which have low boiling points and are suitable to be employed as refrigerants.

It has been found by experiment that the halogenated derivatives of methyl ether are suitable to be employed as refrigerants. It has further been found that where the greater number of hydrogen atoms of the methyl ether are replaced by a halogen a more stable compound is produced, especially so if the halogen substituted for the hydrogen is fluorine. Such derivatives are non-toxic and non-inflammable while having the desired physical properties of stability and low boiling point.

In preparing the halogenated derivatives which it has been found suitable to be employed as refrigerants, any suitable method of chlorination and fluorination may be employed. One method which has been found to produce a compound having the desired characteristics is to prepare monochlorodimethyl ether by running chlorine into a flask or container in which there is an excess of methyl ether and which is provided with a reflux condenser. The monochlorodimethyl ether resulting is then further chlorinated by bubbling chlorine through it and exposing the contents of the container to a strong light. The chlorinated product is then fractionated producing di, tri and tetrachlorodimethyl ethers.

These products are then fluorinated by refluxing them with an excess of sublimed antimony fluoride for several hours after which the resulting mixture is washed with water, the acids are neutralized and the mixture dried with barium oxide.

As a specific example, when trichlorodimethyl ethers are fluorinated by the hereinbefore mentioned process, a mixture results which has a boiling point between 30° and 55.3° C. The components of the mixture resulting from the fluorination of trichlorodimethyl ether are then separated by a fractional distillation. Their identities can be established by their molecular weights and by analysis as fluorochloromethyl fluoromethyl ether, which has the empirical formula of $C_2F_2ClH_3O$ and difluoromethyl fluoromethyl ether which has the empirical formula of $C_2F_3H_3O$.

By experiment, it is found that fluorochloromethyl fluoromethyl ether has a boiling point of 55.3° C. and melts at −105.1° C. while difluoromethyl fluoromethyl ether has a boiling point of 30.1° C. Difluoromethyl fluoromethyl ether is non-combustible, has a very slight odor resembling chloroform and is resistant to hydrolysis. The methyl ether derivative difluoromethyl fluoromethyl ether is especially useful in rotary compressors and where it is desired to maintain reduced pressures.

As another specific example when tetrachlorodimethyl ethers are fluorinated by the hereinbefore mentioned process, a mixture results which has a boiling point below 65° C. Upon fractionating, the mixture separated into two components, one boiling at 35.7° to 36° C. and the other boiling at 61° C.

The structure and identity of the high boiling component is not known. The low boiling component is identified by analysis and by its molecular weight as trifluoro-chloro dimethyl ether which has the empirical formula of $C_2F_3ClH_2O$. By test it is found that trifluoro-chloro dimethyl ether melts between −115° C. and −130° C. This halogenated derivative of methyl ether is very desirable as a refrigerant.

It is thus evident that the halogenated derivatives of methyl ether are suitable to be employed as refrigerants. It is also evident that such halogenated derivatives are easily and economically produced and are stable enough and have a sufficiently low boiling point as to make a desirable refrigerant.

Although this invention has been described with reference to specific refrigerants, it is to be understood that the invention is not to be limited by such reference for within the scope of the appended claims the invention may be practiced otherwise.

I claim as my invention:

1. A halogenated methyl ether compound consisting of a methyl ether chlorinated to replace hydrogen and fluorinated to replace chlorine thereby producing a stable non-toxic compound which boils at a low temperature.

2. A halogenated methyl ether compound consisting of a methyl ether halogenated with fluorine until the compound carries sufficient fluorine to render it stable and has a low boiling point, the fluorine being introduced into the compound by chlorinating the methyl ether to replace hydrogen with chlorine and then fluorinating the chlorinated product to replace chlorine with fluorine.

3. A halogenated methyl ether derivative consisting of a halogenated methyl ether containing sufficient fluorine to provide a stable compound having a boiling point of below 65° C., the fluorine being introduced by chlorinating methyl ether to replace some of the hydrogen atoms with chlorine atoms and then fluorinating the chlorinated product to replace some or all of the chlorine atoms with the fluorine atoms.

4. A halogenated methyl ether derivative consisting of a halogenated methyl ether containing sufficient fluorine to provide a stable compound having a boiling point of below 65° C., the fluorine being introduced by chlorinating methyl ether to produce a mixture of di, tri and tetra-chlorodimethyl ethers and then fluorinating one of said ethers to replace some or all of the chlorine atoms with fluorine atoms.

5. A halogenated methyl ether derivative consisting of a halogenated methyl ether containing sufficient fluorine to provide a stable compound having a boiling point of below 65° C., the fluorine being introduced by chlorinating methyl ether to produce a mixture of di, tri and tetra-chlorodimethyl ethers and then fluorinating one of said ethers to replace chlorine with sufficient fluorine to render it stable.

6. As a new compound fluorochloromethyl fluoromethyl ether.

7. As a new compound difluoromethyl fluoromethyl ether.

8. As a new compound difluoromethyl fluoromethyl ether ($C_2F_3H_3O$) produced by chlorinating methyl ether and then fluorinating the chlorinated product to replace the chlorine atoms with fluorine atoms.

9. As a new compound trifluoro-chlorodimethyl ether ($C_2F_3ClH_2O$) produced by chlorinating methyl ether and then fluorinating the chlorinated product to replace some of the chlorine atoms with fluorine atoms.

10. Halogenated methyl ethers consisting of a mixture of fluorochloromethyl fluoromethyl ether ($C_2F_2ClH_3O$) and difluoromethyl fluoromethyl ether ($C_2F_3H_3O$) produced by introducing sufficient chlorine into methyl ether to produce trichlorodimethyl ether and then fluorinating the trichlorodimethyl ether.

HAROLD S. BOOTH.